July 7, 1925.
C. L. SMITH ET AL
SALT RAKE
Filed March 20, 1920
1,545,361
3 Sheets-Sheet 1
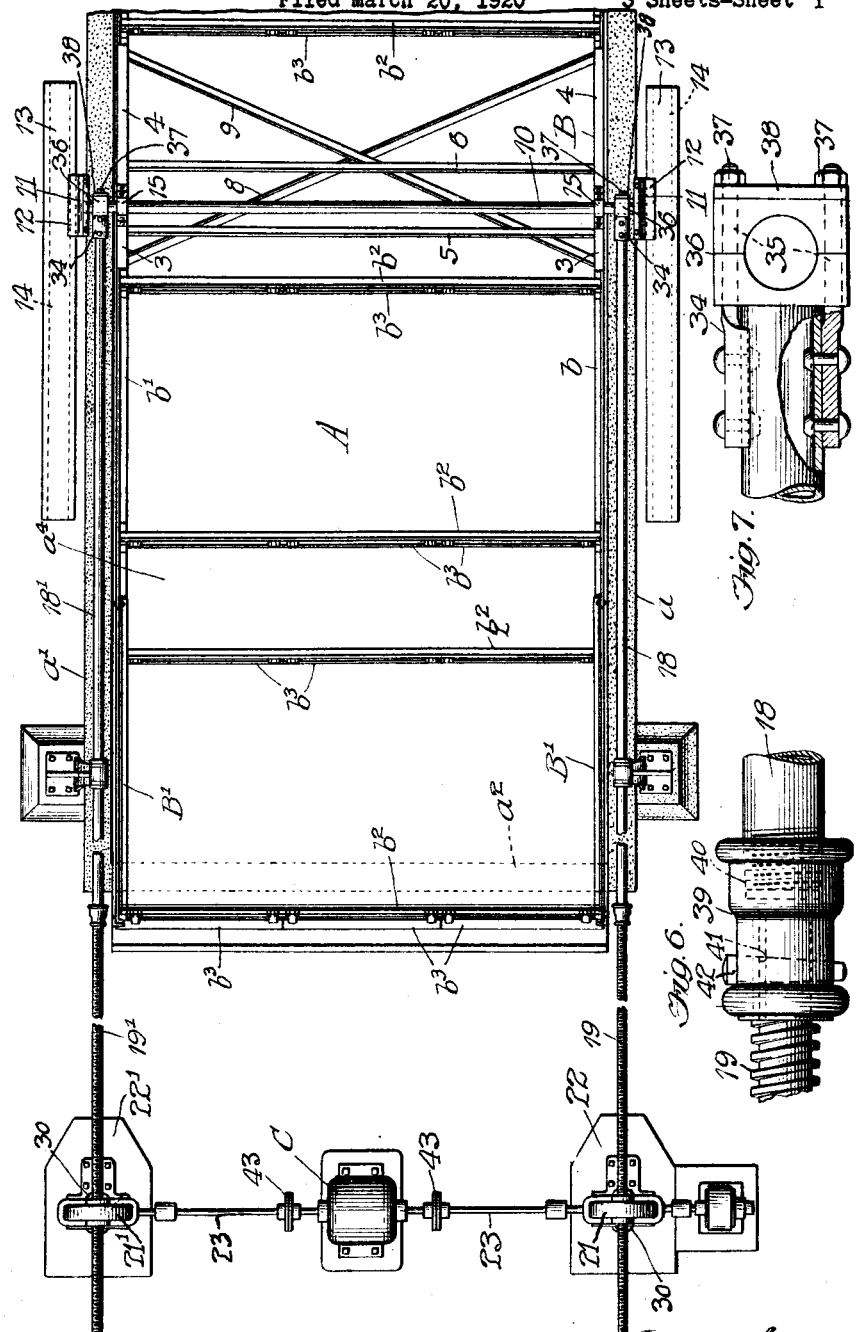
Witness
Martin H. Olsen.
Inventors
Carlton L. Smith and
Arthur B. Crane
By Wm. E. Waldo
Atty.

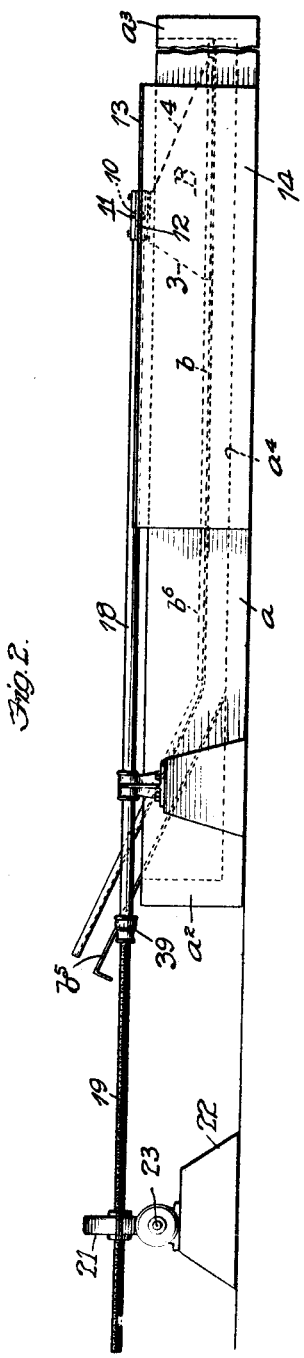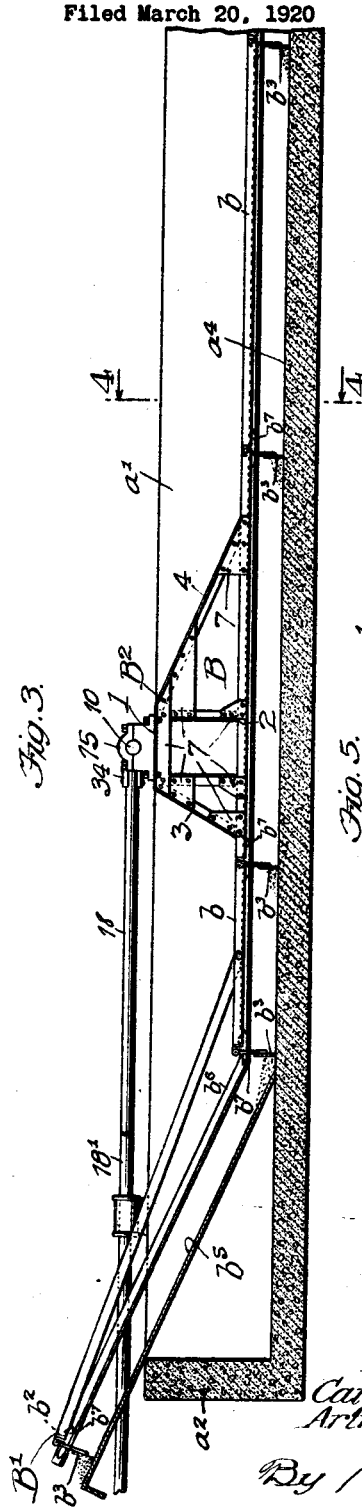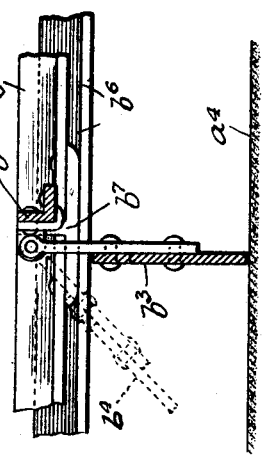

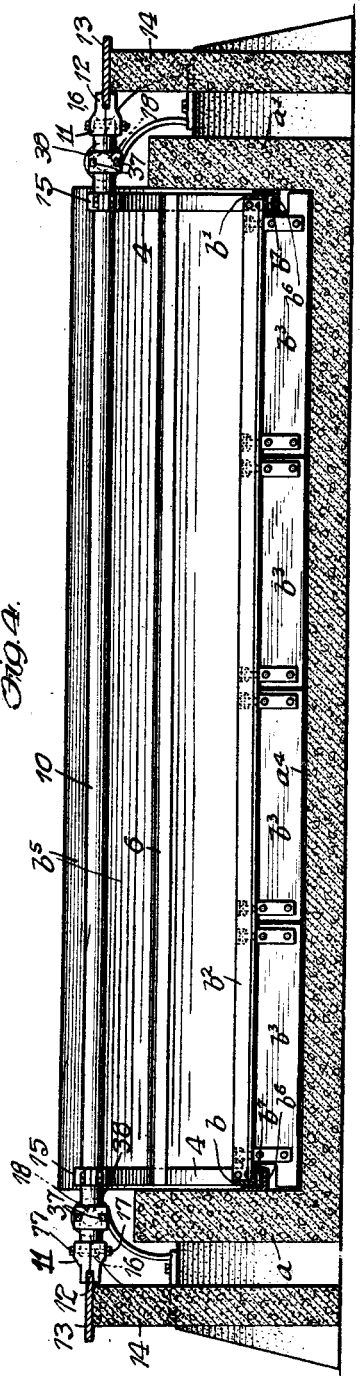

Patented July 7, 1925.

1,545,361

UNITED STATES PATENT OFFICE.

CARLTON L. SMITH AND ARTHUR B. CRANE, OF SAGINAW, MICHIGAN, ASSIGNORS TO NATIONAL PLATE GLASS COMPANY, OF DETROIT, MICHIGAN, A CORPORATION OF MARYLAND.

SALT RAKE.

Application filed March 20, 1920. Serial No. 367,542.

*To all whom it may concern:*

Be it known that we, CARLTON L. SMITH and ARTHUR B. CRANE, citizens of the United States, and residents of Saginaw, in the county of Saginaw and State of Michigan, have invented a certain new and useful Improvement in Salt Rakes, of which the following is a specification.

This invention relates to salt rakes of the type commonly used for lifting or removing grainer salt from open grainer vats, and relates particularly to means for operating such salt rakes.

As is generally well known, the vats used for making grainer salt are quite large, a usual size therefor being about 150 feet long, 12 feet wide and 2 feet deep. In practice, said vats are usually arranged in batteries and the salt rakes for lifting or removing the salt from the grainer vats are operated by means of hydraulic cylinder and piston motors, which are in controlled communication with a common water supply pipe or line adapted for connecting said hydraulic motors with a source of supply of water under pressure.

Heretofore, the common practice has been to install said motors in such positions that the axes of the piston rods thereof will be only slightly above the bottom of the grainer vats, bearings for said piston rods being provided in the walls of said vats through which the piston rods extend. It is found that in operation the salt crystals accumulating on the piston rods very quickly score and cut the piston rods and their bearings in the walls of the grainer vats so that after the grainers have been in operation for even a short time, leakage of brine occurs at said bearings. To prevent this, fresh water seals are ordinarily employed, the level of the sealing water being slightly higher than the normal level of the brine in the vats so that the head of fresh water will somewhat more than counterbalance the head of salt water contained in the grainer vats. As a result of this difference in level and pressure, as soon as the piston rods and their bearings become scored and worn sufficiently to cause leakage, fresh water forming said water seal will leak through said bearings into the grainer vats, thus diluting the brine and reducing the efficiency of operation of the grainer, as all sealing water leaking into the grainer vats will have to be evaporated.

Also, on account of the leakage which occurs through the piston rod bearings, and to reduce this leakage as much as possible, the practice has been to use only one motor for each grainer, the piston rod of which is connected to the transverse center of the cross head of the rake. This manner of connecting the piston rods has a tendency to cause the cross heads to bind on their guide bearings, thereby greatly increasing the power necessary to operate the salt rakes and in many cases, even causing the cross heads to jam so that they stall the motors connected thereto and thus prevent operation of the salt rake.

A further effect of the binding of the cross heads of the rakes on their guide bearings is that the power required for operating different rakes will vary, so that, in order that the different salt rakes may operate at desired rates of travel, it becomes necessary to adjust the motors operating the rakes of different motors separately.

A principal object of the present invention is to provide means for operating salt rakes of the type specified in which water seals will be dispensed with and all leakage of fresh water into the grainer vat thereby prevented.

A further object of the invention is to provide driving means for the grainer rakes of different grainers by which all side draft will be prevented and which will be entirely independent and self-contained, whereby said operating means may be separately adjusted and operated without reference to any of the other rakes and will be entirely unaffected thereby.

To effect the foregoing objects, our improved salt rake and the operating mechanism therefor comprise the various features, combinations of features and details of construction hereinafter described and claimed.

In the accompanying drawing, in which our invention is fully illustrated,

Figure 1 is a partial top plan view of a salt grainer equipped with rake operating mechanism of our invention.

Figure 2 is a side elevation thereof.

Figure 3 is an enlarged fragmentary view showing the grainer vat in longitudinal section and the rake in side elevation.

Figure 4 is a sectional elevation on the line 4—4 of Fig. 3.

Figure 5 is an enlarged fragmentary detail view illustrating the construction of the rake and the means for slidably supporting the same.

Figures 6 and 7 are enlarged fragmentary detail views of certain parts; and

Figures 8 and 9 are enlarged sectional views of the gearing forming part of the rake operating mechanism.

Referring now to the drawings, A designates the grainer vat, comprising side walls $a$, $a^1$, end walls $a^2$, $a^3$, and a bottom $a^4$. Said grainer vat may conveniently be made of concrete, but may be made of any desired material, as wood or the like.

Mounted in the grainer vat, so as to be movable endwise therein in both directions, is the salt rake comprising a cross head, designated as a whole B, secured to the lower edge of which are longitudinal frame members $b$, $b^1$. Said side frame members $b$, $b^1$ are rigidly connected by transverse frame members $b^2$, to which the scrapers $b^3$ are pivoted in such manner that on the forward movement of the rake, they will be supported in substantially vertical position with their lower edges in close proximity to the bottom of the grainer vat, but will be free to turn pivotally on the rearward stroke of the rake, into the position indicated in dotted lines at $b^4$, in case an obstruction is encountered.

Said salt rake comprises a section $B^1$ at its front end, the rear end of which is pivotally connected adjacent to the front ends of the longitudinal frame members $b$, $b^1$ of the main section of said rake, the front ends of said pivoted frame members being connected by a transverse member $b^2$ to which a scraper $b^3$ is also pivoted. The front end of the pivoted rake section $B^1$ of said rake moves upon an inclined board $b^5$, commonly known as a drip board, the rear end of which rests on the bottom of the grainer vat and the front end of which extends over the front wall $a^2$ of the grainer vat.

Said salt rake is slidably supported in operative position by guides consisting, as shown, of angle bars $b^6$ secured to the side walls of the grainer vat, the weight of said rake being sustained by shoes $b^7$, preferably made of cast iron, secured thereto at intervals, thus providing for renewing them as they become worn.

As shown, said cross head B comprises side frame members $B^2$ made up of top and bottom frame members 1 and 2 which are rigidly connected by inclined front and rear frame members 3 and 4 and intermediate frame members 5 and 6. Said frame members 1 to 6 are preferably made of angle iron and are rigidly joined together by means of plates 7 riveted or otherwise rigidly secured thereto at points of connection, in a familiar manner.

Said side cross head members $B^2$ are connected by transverse and diagonal braces 8 and 9, applied to the tops and bottoms thereof, respectively.

The longitudinal rake members $b$, $b^1$ are riveted or otherwise rigidly connected directly to the lower frame members 2 of the side cross-head members $B^2$, and said cross heads are supported in operative position within the grainer vat by means of bars 10 secured to the ends of which are heads 11 provided in their outer sides with slotted bearings 12 which are slidably fitted to the edges of bearing plates 13 bolted or otherwise rigidly secured to the tops of supporting walls 14 formed outside of and which extend substantially parallel with the side walls $a$, $a^1$ of the grainer vat, and which may likewise be made of concrete.

With the described construction, it is obvious that the entire weight of the cross head B and the driving connections thereto will be carried by the bearing plates 13, so that, by keeping the cross-head bearings properly lubricated, the power required for operating the salt rake will be appreciably reduced.

Also, where several grainers are arranged side by side in a battery, bearing plates 13 arranged between adjacent grainers may form the cross-head bearings for both grainers, correspondingly reducing the cost of the installation.

It is also obvious that, by using several cross-heads B, the salt rake may be supported entirely by said cross-heads and the angle bars $b^6$ for supporting said rake entirely dispensed with.

The supporting bars 10 will preferably be made of lengths of gas pipe of suitable size and thickness to provide adequate strength. Said supporting bars are connected to the side frame members of the cross head by securing them in journal boxes 15 secured to the side frame members of said cross head, and the ends thereof engage sockets 16 formed in the heads, said heads being pinned or otherwise secured to said bar.

In the preferable construction shown, the heads 11 are made in symmetrical sections adapted to be rigidly connected by bolts or cap screws 17, the slots 12 and sockets 16 being formed one-half in each of the sections of said heads.

The travel of the salt rake is sufficiently longer than the distance between the scrapers $b^3$ so that the extreme positions of adjacent scrapers will overlap, thus providing for advancing the salt, which precipitates and settles to the bottom of the tank towards the front end of said tank by a step by step movement until it finally reaches the drip board $b^5$ along which it is moved until it finally reaches and passes over the front end of said drip board and is deposited outside of the grainer vat, all in a familiar manner.

In accordance with our invention, the means for operating the salt rake comprise connecting rods 18, 18', the rear ends of which are connected to the supporting bar 10 of the front cross head B of the rake, and which comprise screw threaded sections 19, 19' at their front ends which engage correspondingly screw threaded nuts 20, rotatably mounted in housings 21, 21' mounted in fixed position on foundations 22, 22' positioned a suitable distance from the grainer vats to provide for desired endwise movement of the screw threaded sections of said cross bar to impart contemplated movement to the salt rakes.

Rotation at the same rate of speed is adapted to be imparted to said nuts by means of suitable driving connection with a shaft 23 to which rotation is adapted to be imparted alternately in opposite directions by suitable power means provided for the purpose, as presently described.

As shown, the connection between the shaft 23 and the nuts 20, consists of worms 24 secured to said shaft which engage worm wheels 25 secured to rotate with the nuts 20.

In the preferable construction shown, also, the shaft 23 is mounted in bearings formed in the housings 21, 21', said housings being also constructed to form closed gear casings, thus providing for running the worms 24 and worm wheels 25 in oil, if desired. To provide for assembling said gear casing to enclose the worm gear 25, said housings 21, 21' consist of upper and lower sections adapted to be rigidly connected by bolts or cap screws and to provide for assembling the worm shaft 23 and the worm 24, the bearings for said shaft are preferably formed directly in heads 26 adapted to be removably secured to opposite ends of a substantially cylindrical portion of the housings 21, 21', in which said shaft and worm are mounted, said heads being provided with hubs or bosses 27 in which the bearings for the worm shaft 23 are formed directly.

The gear casings formed by the housings 21 are provided in their tops with holes 28 through which oil may be poured into said casings. Said holes 28 are adapted to be closed by suitable screw plugs, and said gear casings are adapted to be drained by means of holes 29 formed at the bottoms of the chambers therein.

In accordance with my invention, the escape of oil from the casings formed by the housings 21, 21' through the bearings for the worm shaft 23 formed therein, is prevented by mounting said shaft 23 and the worms 24 above the worm wheels 25 and above the level of the oil contained in said casings.

The bearings for the shaft 23 are provided with separate oil holes and passageways arranged to drain into the casings formed by said housings.

Also, in order to catch any oil which may leak from the gear casings, said housings are provided adjacent to their bottoms, with what may be described as drip cups 30, which, as shown, are formed integral with said housings.

To provide for taking up any lost motion of the nuts 20, due to wear produced by the thrust to which they are subjected in use by the power required for operating the salt rake, said nuts are preferably provided with thrust bearings located outside of the casings formed by the housings 21, 21'. As shown, the construction of said thrust bearings is as follows: The ends of said nuts 20 project through their bearings in the housings 21, 21' and threaded to the ends thereof are collars 31. Said nuts are preferably made of phosphor bronze and inserted between the inner nuts and the outer faces of the hubs in which the bearings for said nuts are formed, are collars 32 which are preferably made of steel and are keyed or otherwise secured to the nuts 20 so as to rotate therewith. With the described construction, it is obvious that if at any time, any lost motion of the nuts 20 develops, such lost motion can at once be taken up by screwing up the collars 31. Also, to prevent play or lost motion of the worms 24, said worms are preferably provided with thrust bearings consisting, as shown, of collars 33 placed over the shafts 23 between the ends of said worms and the inner ends of the hubs or bosses 27 in which the bearings for said shafts are formed. As shown, said collars 33 comprise three collars at each side of the worms 24, comprising outer collars made of bronze and intermediate collars made of steel. With the described construction, it is obvious that if lost motion occurs in the bearings of said worms, due to wear of the thrust collars 33, this can be conveniently remedied by replacing the worm collars with other collars of proper thickness to take up such lost motion.

For convenience and economy of manufacture, the connecting rods 18, 18' are preferably made of pieces of gas pipe of suitable size and thickness to provide requisite strength, and the screw threaded sections 19, 19' thereof are formed by separate solid rods the ends of which are connected to the front ends of the connecting rods 18, 18' by suitable couplings.

Simple means for connecting the rods 18, 18' to the supporting bar of the front cross head B is as follows: Riveted or otherwise secured to the rear end of said connecting rods 18, 18' are fittings 34 formed on and projecting rearwardly from which are shanks 35 which extend through holes formed in boxes 36 on said cross head supporting bar, threaded to which are nuts 37. To prevent play or lost motion of the boxes 36 on the cross head supporting bar 11, it is desirable that said boxes be tightly fitted to said supporting bar. This can be effected in a simple manner by splitting said boxes and relieving the adjacent faces of the sections thus formed, so that when adjusted to said supporting bar, they will be separated by narrow spaces. Said nuts 37 will thus form clamping nuts adapted for clamping the sections of said boxes tightly upon said cross head supporting bar. As shown, also, steel straps or washers 38 are inserted over the projecting rear ends of the shanks 35, against which the nuts 37 bear directly.

Simple means for connecting the screw threaded sections 19, 19' to the sections of the connecting rods 18, 18, formed by the lengths of gas pipe, as described, consists of unions 39 formed in the rear ends of which are sockets 40 adapted to receive the front ends of the gas pipe sections of said connecting rods, said gas pipe sections preferably having screw threaded engagement with said sockets and being also pinned thereto. In their front ends, said unions are provided with holes or sockets 41 adapted to receive the rear ends of the screw threaded sections 19, 19' of said connecting rods, which are rigidly secured therein by keys 42. The rear sides or edges of said keys and the rear ends of the key slots in said unions and in the screw threaded sections of said connecting rods are correspondingly tapered, the relation being such that said keys will exert a wedging action between the front ends of the key slots in said union and the rear tapered ends of the key slots in said connecting rods sections which will force the rear ends of said connecting rod sections into firm bearing against the bottoms of the sockets 40 in said unions, thereby effectually preventing all lost motion in said couplings.

In the preferable construction shown, the worm shafts 23 are driven by means of electric motors, preferably mounted on a suitable foundation between the housings 21, 21', one of said motors being indicated at C.

The worm shafts 23 are preferably made in sections which are directly connected to the rotor shaft of said motor by means of suitable couplings indicated at 43. While any desired or approved form of coupling may be used for thus connecting the sections of said worm shaft to the armature shaft of the motor, I prefer to use flexible couplings, thereby obviating the necessity for the nice alignment of the worm shaft bearings with the axis of the rotor shaft of the motor, which would otherwise be necessary. Couplings suitable for this purpose may be purchased commercially and need not, therefore, be described in detail.

With a rake operating mechanism such as herein shown and described, desired reciprocating movement is adapted to be imparted to the salt rake by reversing the direction of rotation of the motor C. Means for this purpose can readily be supplied by electricians of ordinary skill and the same are not, therefore, herein shown and described.

Our invention, however, contemplates various departures from the specific driving means herein shown and described. Thus, other forms of gearing may be used instead of worm gears; the worm or other power shaft instead of being connected directly to the armature shaft of the motor, may be connected thereto by suitable gearing; and the power for operating the salt rakes may be supplied from any other desired or available source of power instead of from the motor C, as shown.

We claim:—

1. A salt rake forming part of an apparatus for making grainer salt, and means for operating the same, said salt rake comprising a single cross-head, longitudinal frame members secured to opposite ends thereof, transverse frame members which rigidly connect said longitudinal frame members, scrapers pivoted to said transverse frame members, and cross-head guides consisting of plates supported at opposite sides of the grainer vat and outside of the walls thereof, said cross-head being provided with bearings slidably fitted to the edges of said guide plates, and the rake operating mechanism being connected directly to said cross-head.

2. A salt rake and operating mechanism therefor as specified in claim 1, in which the cross-head comprises a bar the ends of which project laterally therefrom over the side walls of the grainer vat, and heads secured to the projecting ends thereof provided with slots which slidably engage the guide plates for the cross-heads.

3. A salt rake and operating mechanism therefor as specified in claim 1, in which the cross-head comprises a bar the ends of which project laterally therefrom over the side walls of the grainer vat, and heads secured to the projecting ends thereof provided with slots which slidably engage the guide plates for the cross-head, and means for operating the rake are connected to the projecting ends of said bar.

4. A salt rake forming part of an apparatus for making grainer salt of the general type specified, and operating means therefor comprising a connecting rod secured thereto, the front end of which is screw threaded, a nut threaded thereto, a power shaft, gearing which connects said shaft and nut, and means for imparting rotation to said power shaft alternately in opposite directions.

5. A salt rake forming part of an apparatus for making grainer salt as specified in claim 4, in which the nut threaded to the connecting rod, the power shaft, and the gearing which connects said power shaft and nut is mounted in a housing constructed and arranged to form a closed casing for said nut and gearing.

6. A salt rake forming part of an apparatus for making grainer salt as specified in claim 4, in which the gearing which connects the power shaft and nut consists of a worm and worm gear secured thereto, respectively.

In testimony that we claim the foregoing as our invention, we affix our signatures this 28 day of February, 1920.

CARLTON L. SMITH.
ARTHUR B. CRANE.